(12) United States Patent
Kämmerer

(10) Patent No.: US 7,398,208 B2
(45) Date of Patent: Jul. 8, 2008

(54) METHOD FOR PRODUCING REFERENCE SEGMENTS DESCRIBING VOICE MODULES AND METHOD FOR MODELING VOICE UNITS OF A SPOKEN TEST MODEL

(75) Inventor: Bernhard Kämmerer, Taufkirchen (DE)

(73) Assignee: Siemens Atkiengesellschaft, Munich (DE)

( * ) Notice: Subject to any disclaimer, the term of this patent is extended or adjusted under 35 U.S.C. 154(b) by 756 days.

(21) Appl. No.: 10/492,302

(22) PCT Filed: Oct. 1, 2002

(86) PCT No.: PCT/DE02/03717

§ 371 (c)(1),
(2), (4) Date: Apr. 12, 2004

(87) PCT Pub. No.: WO03/034402

PCT Pub. Date: Apr. 24, 2003

(65) Prior Publication Data

US 2004/0249639 A1 Dec. 9, 2004

(30) Foreign Application Priority Data

Oct. 11, 2001 (DE) ................. 101 50 144

(51) Int. Cl.
*G10L 15/06* (2006.01)
*G10L 17/00* (2006.01)
(52) U.S. Cl. ................ 704/241; 704/243; 704/256.4

(58) Field of Classification Search .......... 704/236, 704/238, 241, 243, 245, 246, 249, 250, 251, 704/254, 255, 256, 256.1, 256.2, 256.4
See application file for complete search history.

(56) References Cited

U.S. PATENT DOCUMENTS

| | | | | | |
|---|---|---|---|---|---|
| 3,700,815 | A | * | 10/1972 | Doddington et al. | 704/246 |
| 4,326,101 | A | * | 4/1982 | Sakoe | 704/241 |
| 4,348,553 | A | * | 9/1982 | Baker et al. | 704/241 |
| 4,570,232 | A | * | 2/1986 | Shikano | 704/241 |
| 4,751,737 | A | * | 6/1988 | Gerson et al. | 704/243 |

(Continued)

FOREIGN PATENT DOCUMENTS

DE 19610848 A1 9/1997

OTHER PUBLICATIONS

Aiber et al., "Multiple Template Modeling of Sublexical Units", Speech Recognition and Understanding, Recent Advances, Trends and Applications, Proceedings of the Nato Advanced Study Institute, Cetraro, Italy, Jul. 1-13, 1990, pp. 519-524.

(Continued)

*Primary Examiner*—Martin Lerner
(74) *Attorney, Agent, or Firm*—Staas & Halsey LLP

(57) ABSTRACT

A method models voice units and produces reference segments for modeling voice units. The reference segments describe voice modules by characteristic vectors, the characteristic vectors being stored in the order in which they are found in a training voice signal. Alternative characteristic vectors are associated with each characteristic vector. The reference segments for describing the voice modules are combined during the modeling of larger voice units. In the event of identification, the respectively best adapted characteristic vector alternatives are used to determined the distance between a test utterance and the larger vocal units.

24 Claims, 7 Drawing Sheets

U.S. PATENT DOCUMENTS

| | | | | |
|---|---|---|---|---|
| 4,802,226 | A | * | 1/1989 | Watanabe ................... 704/241 |
| 4,805,219 | A | * | 2/1989 | Baker et al. ................. 704/241 |
| 4,882,756 | A | * | 11/1989 | Watari ........................ 704/241 |
| 4,903,305 | A | * | 2/1990 | Gillick et al. ............... 704/245 |
| 4,975,962 | A | * | 12/1990 | Oka ........................... 704/241 |
| 4,977,599 | A | * | 12/1990 | Bahl et al. ................ 704/256.4 |
| 5,072,452 | A | * | 12/1991 | Brown et al. ............. 704/256.4 |
| 5,742,928 | A | * | 4/1998 | Suzuki ....................... 704/239 |
| 5,758,022 | A | * | 5/1998 | Trompf et al. ............. 704/232 |
| 6,026,359 | A | * | 2/2000 | Yamaguchi et al. ...... 704/256.4 |
| 6,389,392 | B1 | * | 5/2002 | Pawlewski et al. ......... 704/241 |
| 6,401,064 | B1 | * | 6/2002 | Saul ........................... 704/240 |
| 6,453,293 | B1 | * | 9/2002 | Kammerer ................. 704/254 |

OTHER PUBLICATIONS

Castro et al., "Automatic Slection of Sublexic Templates by Using Dynamic Time Warping Techniques", Proceeding of the European Signal Processing Conference, Signal Processing V: Theories and Applications, Barcelona, Sep. 18, 1990-Sep. 21, 1990, vol. 5, No. 2, pp. 1351-1354.

Hermann "The Use of a One-Stage Dynamic Programming Algorithm for Connected Word Recognition", IEEE Transactions on Acoustics, Speech and Signal Processing, Apr. 1984, vol. ASSP-32, No. 2, pp. 263-271.

Ghitza et al., "Hidden Markov Models with Templates as Non-Stationary States: An Application to Speech Recognition", Computer Speech and Language, Academic Press, London, GB, vol. 7, No. 2, Apr. 1993, pp. 101-119.

Kämmerer, "Sprecherunabhängigkeit und Sprecheradaption" Informatik Fachberichte 244, Springer Verlag, 1990.

* cited by examiner

NEW TRAINING MODE

METHOD FOR PRODUCING REFERENCE SEGMENTS DESCRIBING VOICE MODULES AND METHOD FOR MODELING VOICE UNITS OF A SPOKEN TEST MODEL

CROSS REFERENCE TO RELATED APPLICATIONS

This application is based on and hereby claims priority to PCT Application No. PCT/DE02/03717 filed on Oct. 1, 2002 and German Application No. 101 50 144.7 filed on Oct. 11, 2001 the contents of which are hereby incorporated by reference.

BACKGROUND OF THE INVENTION

The invention relates to a method for producing reference segments describing speech modules and a method for modeling speech units of a spoken test model in voice recognition systems.

Earlier commonly encountered speech recognition systems are based on the dynamic time warping (DTW) principle. In this situation, for each word a complete sequence of characteristic vectors—obtained from a training utterance for this word—is saved as a reference model and compared in the operational phase with a test model of a voice signal to be recognized by non-linear mapping. The comparison serves to determine the minimum distance between the respective reference model and the test model, and the reference model having the smallest distance from the test model is selected as the reference model that suitably describes the test model.

The disadvantage with this method is the fact that a reference model needs to be stored for every word to be recognized, as a result of which the code book containing the reference models is extremely extensive and the effort involved in training a voice recognition system of such a type whereby a reference model is saved for every word is correspondingly great. In this situation, it is not possible to generate reference models for words differing from the learned language vocabulary. According to the present publication, the characteristics representing the reference models, which are obtained by the auto-correlation function in each case for successive analysis windows at a distance of 10 ms for example, and are subsequently referred to as auto-correlation characteristics, and the spectral characteristics are explained.

The auto-correlation characteristics describe the voice signal contained in the analysis window in the time range and the spectral characteristics, which are obtained by a Fourier transformation, describe the voice signals in the frequency range. In addition, several different distance measurements for determining a distance between two characteristic vectors are explained. In order to improve speaker-independent recognition, with regard to this known method a plurality of reference models is produced for each word, whereby the reference models are in turn ascertained as an averaged value from a plurality of training signals. In this situation, both the time structure of the entire reference model and also the characteristic structure can be ascertained as averaged values. In order to produce groups of reference models which are assigned to a word in each case and exhibit an averaged time structure, training models are mapped in non-linear fashion to an averaged model assigned to this word or word class and then a clustering of the characteristic vectors for the training model and of the reference models already present in the class is carried out separately for each analysis window.

By using this special method it is possible to achieve an extremely good recognition rate, but it is however subject to the disadvantages of the DTW method already described above.

More recent voice recognition systems are based on the HMM method (hidden Markov modeling). In this situation, in the training phase voice segments (for example phonemes or syllables) are collected from a large number of voice signals from different words and are subdivided into nodes (for example one node each per word-initial/word-internal/word-final sound). The characteristic vectors describing the voice signals are assigned to the node and stored in a code book.

With regard to speech recognition, the test model is mapped by a non-linear mapping process (for example with the aid of the Viterbi algorithm) onto a sequence of nodes defined by the transcription (for example a phonetic description) of the word. Since the nodes only describe word segments, reference models for practically any desired word of a language can be produced by concatenation of the nodes or segments. Since as a rule there are normally distinctly fewer phonemes or syllables than words in a language, the number of nodes is significantly less than the number of reference models describing complete words to be stored with regard to the DTW method. As a result, the training effort required for the voice recognition system is significantly reduced when compared with the DTW method.

A disadvantage with this method is however the fact that the timing sequence of characteristic vectors can no longer be ascertained within a node. This is a problem particularly in the case of long segments—such as an extended German "a" for example, in which instances a very large number of characteristic vectors of similar nodes frequently fit although the timing sequence of the vectors does not match. As a result, the recognition rate can be seriously impaired.

In Aibar P. et al.: "Multiple template modeling of sublexical units", in: "Speech Recognition and Understanding", pp. 519 to 524, Springer Verlag, Berlin, 1992 and also in Castro M. J. et al.: "Automatic selection of sublexic templates by using dynamic time warping techniques", and in: "Proceedings of the European Signal Processing Conference", Vol. 5, No. 2, pp. 1351 to 1354, Barcelona, 1990 a segmentation of a training voice signal into speech modules and an analysis for obtaining a characteristic vector are described. In this situation, averaging is also carried out. In Ney H.: "The use of a one-stage dynamic programming algorithm for connected word recognition", and in: "IEEE Transactions of Acoustics, Speech, and Signal Processing", pp. 263 to 271, Vol. ASSP-32, No. 2, 1984 the recognition of words in a continuously uttered sentence is disclosed, whereby a reference template is used for each word.

SUMMARY OF THE INVENTION

One possible object of the invention is therefore to set down a method for producing reference segments describing speech modules and a method for modeling speech units which enable high recognition rates to be achieved in a voice recognition system with a low training effort requirement.

The method uses or produces reference segments describing speech modules, which contain time structured characteristics.

These reference segments are produced in a training phase which can take place as described in the following, for example:

selection of suitable word subunits (phonemes, diphones, syllables, . . . ) as speech modules, determination of an average time structure for the sequence of the characteristic vectors for the selected speech modules from a large number of examples of speech, selection and assignment of characteristic vectors for each of the time windows of the typical time structure storage of the models determined by this means for each speech module, which represent the reference segments and are formed from characteristic vectors which are arranged in a code book in accordance with the time structure.

The recognition phase can take place as described in the following, for example:

combination of the reference segments to form a reference model for a speech unit, such as a word to be recognized for example (in accordance with the phonetic description of this word, for example), execution of a non-linear comparison of the test model to be recognized with the reference models and determination in each case of an overall distance between the reference models and the test model, whereby the minimum distance between the characteristic vector of the test model and the typical characteristic vectors of the speech modules assigned by way of the non-linear comparison is used for each time window, selection of the reference model having the smallest distance from the test model.

The method uses a code book containing reference segments describing speech modules and having time-structured characteristics, in other words such that the characteristics are stored in a specific sequence as reference segments.

Particularly important advantages result if the individual speech modules of a reference model, such as a word for example, are for example a phoneme, a diphone, a triphone or a syllable. That is to say it is possible to combine the advantages of DTW and HMM systems by on the one hand retaining the time structure but on the other hand also being able to generate reference models for new words from existing syllables.

These speech modules are described by reference segments having a typical time structure, whereby one or more characteristic vectors can be provided for each time slot of a speech module. These strings of characteristics or characteristic vectors with the respective alternative characteristics per time window describe the speech modules as they have typically occurred in the training models. As a result of combining a plurality of reference segments to form a reference model, a reference model is obtained whose speech modules contain the time structure ascertained during the training of the voice recognition system, as a result of which the reference model formed in this manner has precisely the same fine time structure as is the situation in the case of the known DTW method.

However, since the reference segments only describe individual speech modules in each case, in the training phase only these reference segments producing the speech modules need to be produced, and their number is significantly less than the number of reference models according to the DTW method.

When compared with known voice recognition systems based on the HMM method, a significantly finer time structure for the reference models is obtained when using the method since the characteristic vectors assigned to a node of the HMM method are stored without time information and as a result the HMM method exhibits no time structuring whatsoever within a node. This difference results in a substantial increase in the recognition rate achieved by the method compared with the HMM method.

A further advantage compared to the known HMM method is the fact that it is not necessary to produce special reference segments which take account of the context—in other words the adjacent segments—since the greater variance in the transition areas between adjacent speech modules can be represented by additional characteristic alternatives. In addition, temporally long speech modules are subdivided into a plurality of time windows as short speech modules, whereby the description of the individual speech modules is effected with the same quality in the case of both short and long speech modules. With regard to the known HMM method on the other hand, the speech modules are represented by a particular, arbitrarily defined, number of nodes which is independent of the length of the speech modules.

The method for producing reference segments for modeling speech units comprises the following steps:

segmentation of the training voice signal into speech modules in accordance with a predefined transcription, analysis of the training signal in predetermined time slots with particular time windows in order to obtain at least one characteristic vector for each time window, as a result of which training models are formed which in each case contain characteristic vectors in the time sequence of the training voice signal, determination of an average time structure for each speech module with a string of time windows, assignment by a temporally non-linear mapping of the characteristic vectors to the time windows of the speech modules and storage of the characteristic vectors assigned in each case to a speech module in the sequence predefined by the time windows as a reference segment.

When using this method, reference segments are produced containing characteristic vectors which are present in the time sequence of the training voice signal and which in each case can be assigned to a speech module. By this means, the time structure of the training voice signal is mapped onto the reference segments, and since the reference segments can in each case be assigned to one speech module it is possible to concatenate a reference model corresponding to a word from the reference segments.

BRIEF DESCRIPTION OF THE DRAWINGS

These and other objects and advantages of the present invention will become more apparent and more readily appreciated from the following description of the preferred embodiments, taken in conjunction with the accompanying drawings of which.

DETAILED DESCRIPTION OF THE PREFERRED EMBODIMENT

Figure 1:
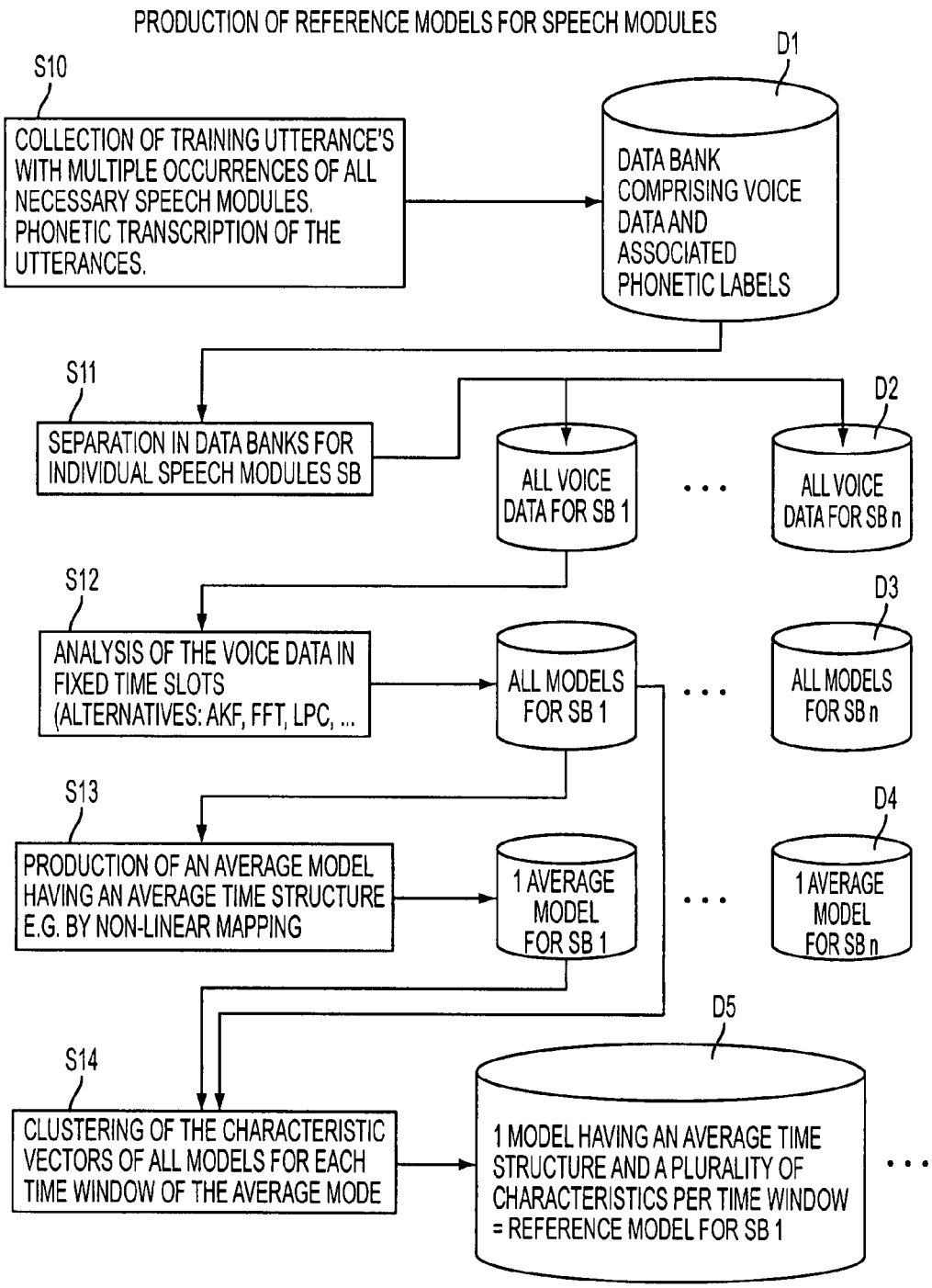
FIG. 1 shows in schematic form the method for producing reference segments (in the training phase)

Reference will now be made in detail to the preferred embodiments of the present invention, examples of which are illustrated in the accompanying drawings, wherein like reference numerals refer to like elements throughout.

The method for modeling speech modules in voice recognition systems uses a code book in which reference segments are stored, which each describe a speech module having time-structured characteristics. In the present embodiment, in each case the speech modules represent phonemes or diphthongs and the time-structured characteristics are spectral characteristic vectors which are stored in the reference segments in the order which corresponds to a typical voice signal of the respective speech module.

The reference segments are subdivided into time windows, whereby a plurality of characteristic vectors can be assigned as alternatives to each time window. Short phonemes, such as a "t" for example, can merely exhibit a single time window. As a rule, however, a plurality of time windows is provided, the number of which results from the duration of the individual phonemes or diphthongs during production of the reference segments divided by the duration of the time windows.

The number of characteristic vectors per time window can vary. In the present embodiment, the maximum number of characteristic vectors per time window is limited to three. It can also be expedient to limit the maximum number of characteristic vectors to considerably greater values, such as 10 to 15 for example, or to provide no corresponding limit.

The basic principle relates to the fact that for the recognition phase the time-structured reference segments are combined to form a reference model and the reference model is compared with a test model which is derived from a voice signal which is spoken and to be recognized.

FIG. 1 shows the functional sequence of a method for producing reference segments for modeling speech units. The method begins with the collection of training utterances with multiple occurrences of all required speech modules (S10) together with the corresponding transcription. This data is placed in a data bank D1 comprising the spoken voice signals and the corresponding phonetic labels. The contents of this data bank DI are separated according to a predefined transcription into data records D2 which in each case are assigned to an individual phoneme or diphthong or other suitable speech modules (S11).

The voice data stored in the data records D2 is analyzed in fixed time slots (S12), in other words the training voice signals are subdivided into the time windows t, as a result of which training models are obtained which in each case contain characteristic vectors in the time sequence of the training voice signal and in each case can be assigned to a speech module. These training models are stored in the data records D3.

An average training model having an averaged time structure and an averaged characteristic structure is determined for each speech module (S13). In this situation, an average time curve and also an average form of the characteristics are ascertained for the available models of a speech module. This can take place for example by way of non-linear mapping, as is described for example in chapters 4.2 and 4.3 of "Sprecherunabhängigkeit und Sprechadaption", Bernhard R. Kämmerer, Informatik Fachberichte 244, Springer Verlag, 1990. In this situation, an average time structure is initially obtained from the individual time structures of the test models by way of non-linear mapping and the characteristic vectors assigned in this situation are averaged. These average models are stored in data records D4.

As a result of a representative average time structure, in other words an average form of change duration and time sequence of characteristics of the speech modules, the possibility of non-linear time adjustment in order to compensate for minor distortions is maintained.

From the data stored in data records D3 and D4, the characteristic vectors of all models are clustered for each time window of the average model of a particular speech module (S14). Known approaches such as k-means, leader algorithm or similar can be used as the clustering method. This results in the production for each speech module of a model which is represented by one or more characteristic vectors per time window. These models form the reference segments which are stored in further data records D5. The data records D5 form the result of the method and are the basis for the subsequent recognition.

As a result of combining the averaging of time structures with a clustering of the assigned characteristics it is possible to avoid the aforementioned disadvantages of HMM voice recognition facilities.

Figure 2:
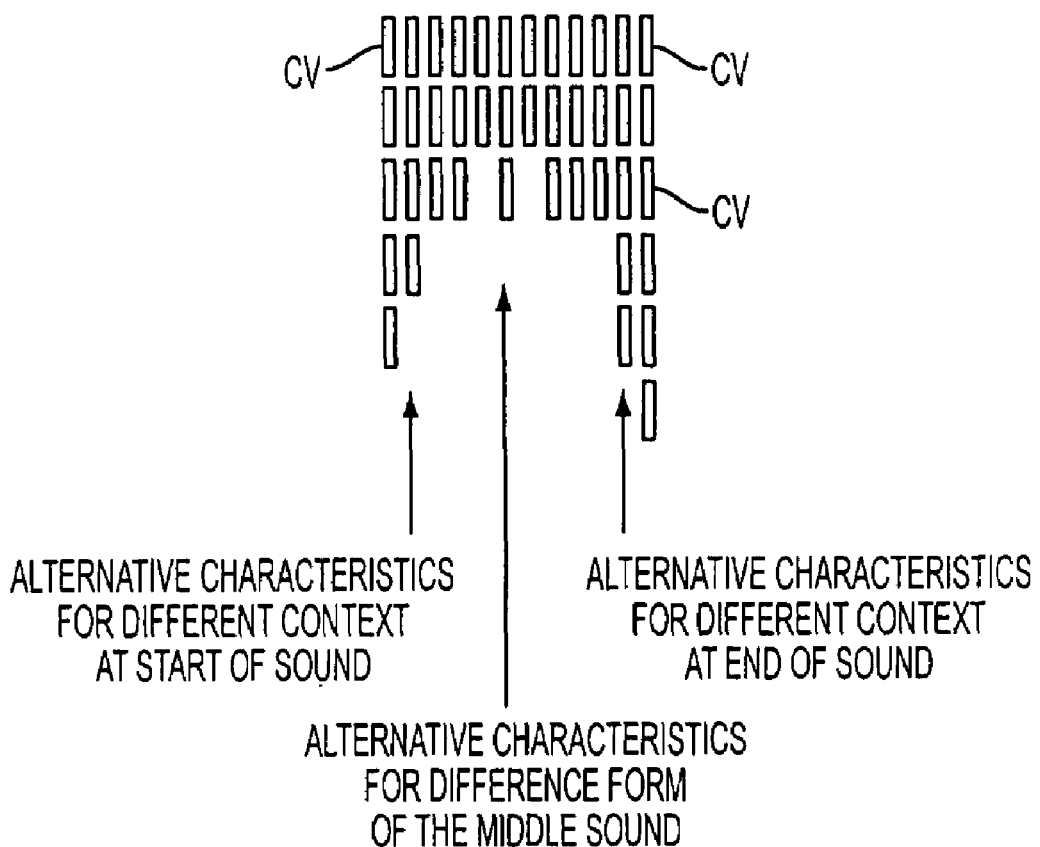
FIG. 2 shows in schematic form clustered characteristic vectors for the speech module "a" which have been obtained from examples of speech having a different context.

FIG. 2 shows in schematic form the clustered characteristic vectors for the speech module "a" which have been obtained from examples of speech having a different context. In this situation, no fixed number of alternative characteristic vectors is provided per time window, instead it is left to the clustering method to define the number in accordance with the variance. In the mid zone fewer characteristic vectors result than in the edge zone since the characteristic vectors of different examples of speech are very similar to one another in the mid zone but differ greatly in the edge zone as a result of the different contexts. Accordingly, more characteristic vectors which represent these differences are produced at the edge zones as a result of the clustering method.

Since the context-dependent differences at the edge zones of the speech modules can be represented by alternative characteristic vectors, it is not necessary to form complete reference segments for speech modules in different contexts, as is the situation in the case of known HMM methods, as a result of which the number of speech modules involved can be kept considerably lower.

Figure 3:
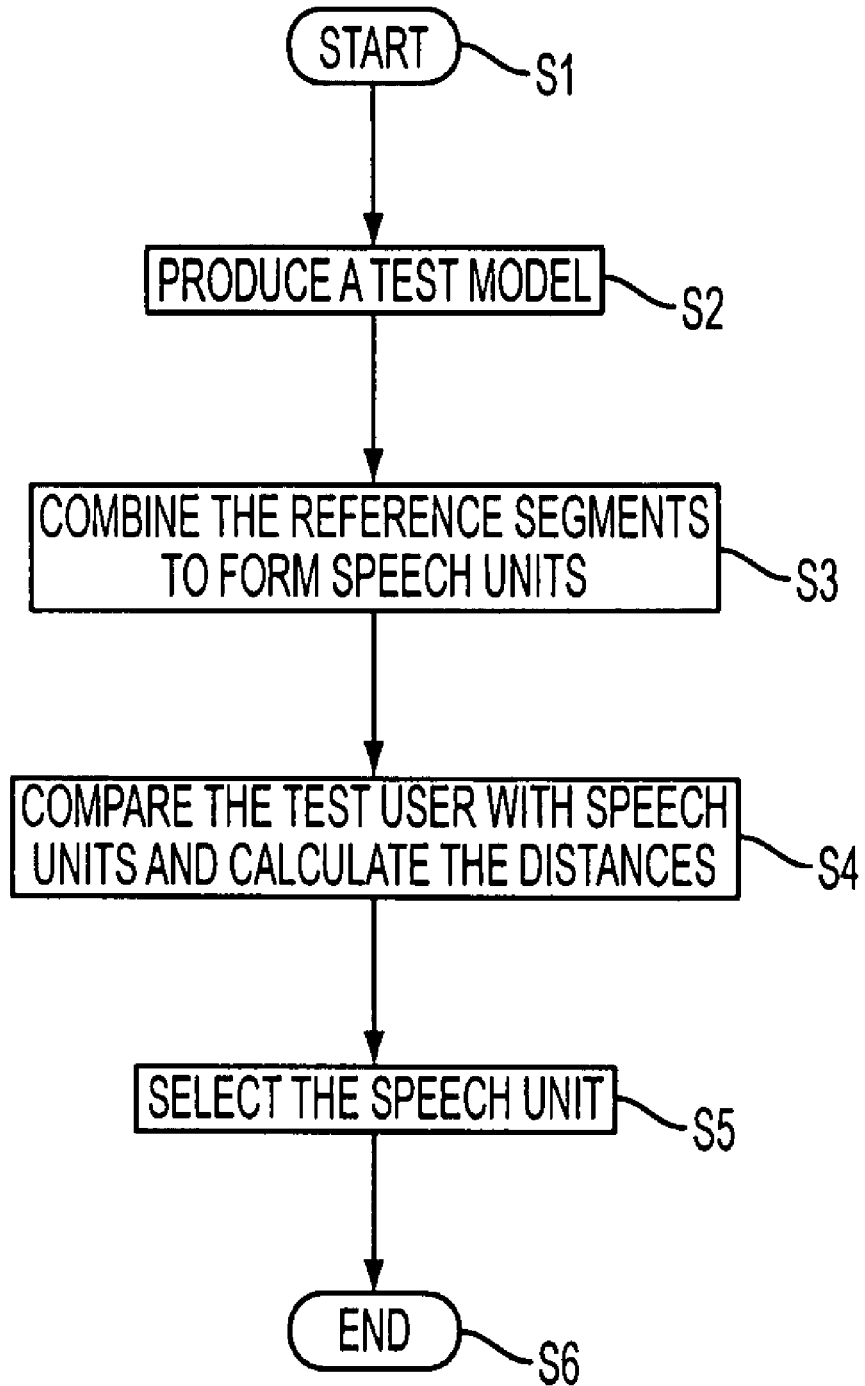
FIG. 3 shows the method for modeling speech units in the form of a flowchart.
Figure 4:
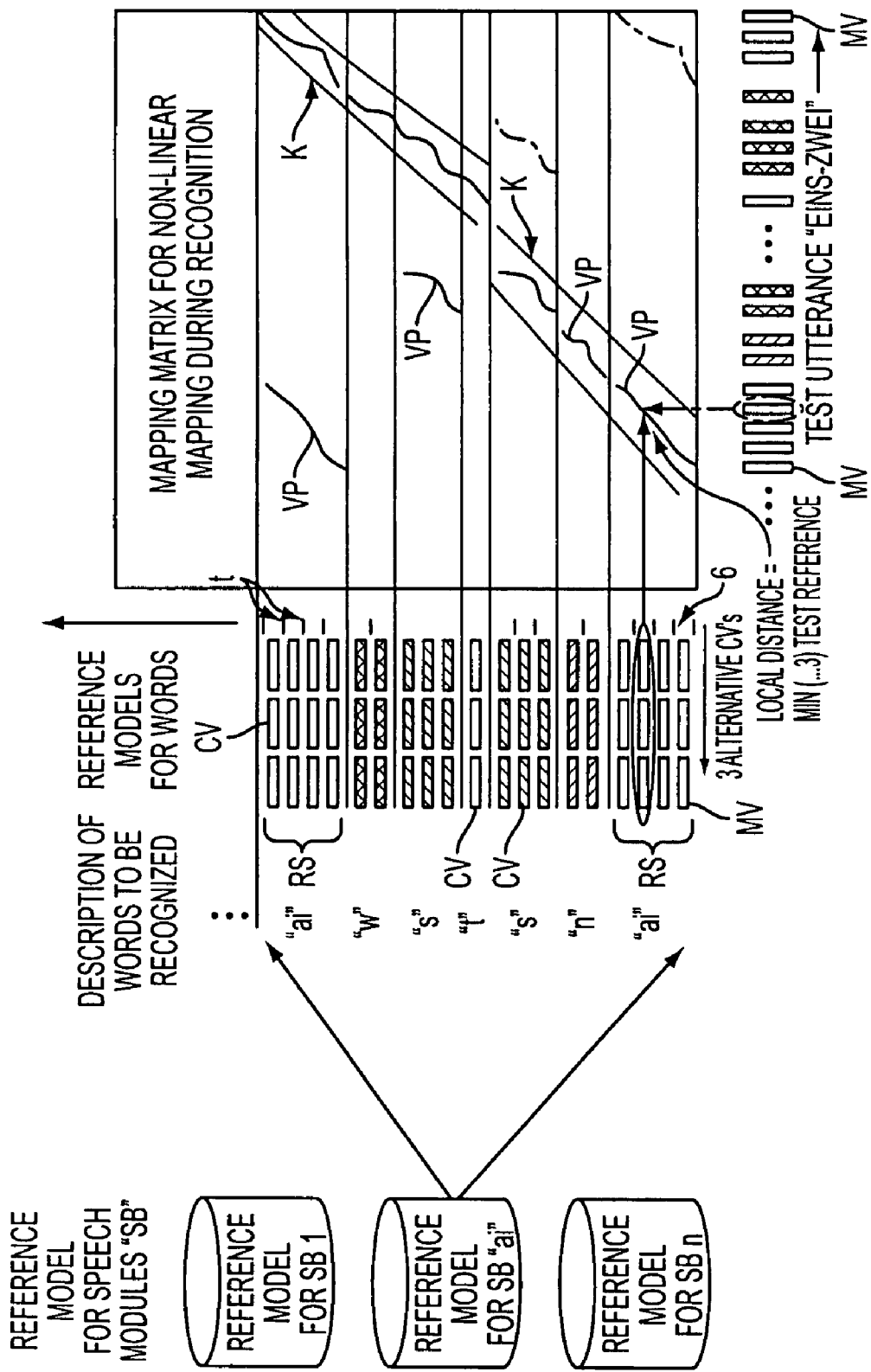
FIG. 4 shows in schematic form a mapping matrix with the reference models, formed from reference segments and the test model.

FIG. 3 shows in schematic form the method for modeling speech units of a spoken test model in voice recognition systems in the form of a flowchart. FIG. 4 shows a mapping matrix in the form of a coordinate system for the situation where a test utterance is recognized.

This method uses a code book in which the time-structured reference segments are stored. In the present embodiment, in each case the speech modules represent phonemes or diphthongs and the time-structured characteristics are spectral characteristic vectors which are stored in the reference segments in the order which corresponds to a typical voice signal of the respective speech module. The method also uses a data bank in which speech units are stored in their phonetic description. In the present embodiment, the speech units are words and the phonetic description of the German words "eins" and "zwei" shown in FIG. 4 is as follows:

"ai" "n" "s" and "t" "s" "w" "ai"

The method begins with step S1.

In step S2, a voice signal to be recognized by a voice recognition system is converted into a test model, whereby the voice signal is changed into corresponding spectral characteristic vectors. These characteristic vectors for the test model are shown schematically along the x-axis.

In step S3, the reference segments are concatenated in accordance with the phonetic description of the words stored in the data bank to form a reference model in each case.

Since in the reference segments the characteristic vectors are assigned to specific time windows t and their sequence is defined, the reference models form a string of time-ordered and thus time-structured characteristic vectors extending over a plurality of phonemes and diphthongs.

Beside the y-axis, the individual phonemes and diphthongs for the German words "eins" and "zwei", namely "ai", "n", "s" and "t" . . . "ai" are shown schematically together with the corresponding reference segments. These reference segments RS are subdivided in accordance with the time windows t of the analysis phase into 1 to 4 time windows t of a predetermined duration. In this situation, each reference segment exhibits three characteristic vectors MV in each case for each time window.

In step S4, the characteristic vectors of the test model are mapped using non-linear time mapping onto the characteristics of the reference segments of the reference models (=combinations of successive characteristic vectors for a word). Non-linear mapping actions of this type can be carried out in accordance with the previously common DTW methods or in accordance with the Viterbi algorithm. These non-linear mapping actions are suited both for isolated recognition and also for contiguously spoken words (continuous speech).

With regard to this mapping, the test models are mapped to all reference models and the respective distances between the reference models and the test model are calculated according to a predetermined distance scale. Distortion paths VP with which the characteristic vectors of the test model are mapped onto the reference models are shown in the mapping matrix.

Different distance scales are known on the basis of the related art (see for example chapter 3.5.1 in Bernhard R. Kämmerer: "Sprecherunabhängigkeit und Sprechadaption", Informatikfachbereich 244, Springer Verlag, 1990).

With regard to the mapping, compared with earlier methods, in the case of each assignment of a time window of the test utterance to a time window of the reference models the smallest distance between the test characteristic vector and the existing alternative reference characteristic vectors is however formed.

In accordance with the specifications for non-linear mapping, these minimum individual distances along the distortion path are accumulated to form an overall distance for the word.

Within the scope of the above it is also possible to employ known pruning methods when comparing the test models with the reference models or to limit the number of reference models to be compared with the test model through the use of voice models.

In step S5, the reference model which exhibits the smallest overall distance from the test model is selected as the recognition result. The distortion paths printed as heavy lines indicate the mapping onto the selected reference model.

The maximum distortion of the distortion paths is preferably restricted to a certain working range, in other words this means that no more than a certain number n of characteristic vectors of the test model may be mapped to one time window of the reference model and one characteristic vector may not be mapped to more than the specific number n of test windows. n is an integer in the range 2 to 5. The consequence of this is that the distortion path runs within a corridor K in the mapping matrix (FIG. 4).

With regard to the method described above, each characteristic vector describes a voice signal for a time window having a predetermined duration which lies in the range 5 ms to 20 ms, and is preferably 10 ms. Instead of spectral characteristics, autocorrelation characteristics or other suitable characteristics can also be used, such as LPC characteristics (linear prediction coefficients), MFCC characteristics (Melfilter coefficients) or CC characteristics (capstral coefficients), for example.

With regard to the above example, each reference segment represents one phoneme or diphthong. Within the scope of the above method, however, it is possible for the reference segments to represent diphones, triphones, syllables or other suitable subunits. Similarly, in addition to a word a speech unit can also represent a phrase or similar.

The reference segments describe speech modules by characteristic vectors, whereby the characteristic vectors are stored in a typical sequence which results from the training voice data. For each characteristic vector, alternative characteristic vectors are specified. With regard to the modeling of larger speech units, the reference segments are combined in order to describe the speech units, as a result of which any words are rendered recognizable with little training effort. The recognition is based on a non-linear mapping, whereby the alternative characteristic vectors are used for determining the local correspondence. The non-linear mapping can be used both for individually spoken words and also for continuous speech.

The differences from HMM voice recognition facilities and the determination of the average time structure will be explained again in detail in the following with reference to FIGS. 1 to 5.

With regard to state-of-the-art HMM voice recognition systems having speaker-independent recognition, speech samples from a very large number of speakers are collected for training purposes. In this situation, the selection of the references for the subsequent recognition phase takes place in such a manner that 1. training utterances are spoken as specified,
2. the resulting voice signals are (frequency) analyzed in a fixed time pattern (10 ms-20 ms) and the characteristics are stored,
3. the characteristic sequence (iterative) is subdivided timewise in accordance with the phonetic transcription, whereby generally each phoneme is additionally further subdivided by a fixed number of states (for example, 3 states: start of phoneme-phoneme core-end of phoneme),
4. a set of representatives which can be placed in a "code book" for the subsequent recognition phase is selected from the individual characteristics of all sections from all utterances which correspond to a state (for example by way of clustering methods). As an alternative to this, distributions can also be stored by way of the characteristic components.

Figure 5:
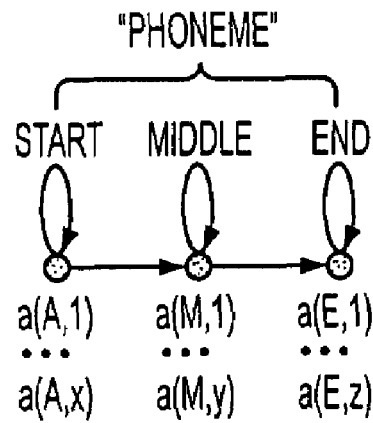
FIG. 5 shows voice recognition in an HMM voice recognition system.

Thereafter, for example, three groups each having a plurality of representatives are therefore represented in the code book for each phoneme: For example, as shown in FIG. 5 for the phoneme "a":

Start Characteristic a(A,I)

. . .

Characteristic a(A,x)
Middle Characteristic a(M,1)

. . .

Characteristic a(M,y)
End Characteristic a(E,1)

. . .

Characteristic a(E,z)

It is important that there is no longer any sequence of characteristics within the states. All can occur at any position with the same probability.

In the recognition phase (Viterbi search) the characteristics of the signal to be recognized are compared with the representatives (distance calculation for example). The minimum distance is then selected within a state. In this situation, the original sequence of the characteristics within a state plays no part. The dwell time in a state is defined either by way of the fixed iteration probability when compared with the transition probability to the next state (exponential reduction in the overall probability according to the number of iterations) or is controlled by way of an average duration determined from the training data (for example Gaussian probability distribution around the duration). The coarse structure is defined only by the sequence of the states (in other words, with regard to the non-linear mapping (Viterbi), it is necessary to go initially from the "start" state, via the "middle" state to the "end" state.

The following disadvantages result from the above:

Inadequate time representation. The fixed division into three states, for example, does not do justice to the extremely variable duration of the real forms of phonemes. An "a" or a glide "ai", for example, can have an extremely long duration (perhaps 20 analysis windows=200 ms), then a very large number of characteristics are mapped onto one state. This corresponds to a disproportionately coarse representation. A "p" can be very short (perhaps only 3 analysis windows), from which an excessively fine modeling results.

Reduced selectivity. With regard to long phonemes, the Viterbi search can find the most favorable representative for each state. This can result in the fact, for example, that a representative which actually stands for the end of the state is used for a large area of the test signal. This may result in an overall distance which is altogether too small and a loss in differentiating capability. Particularly affected here are words whose phonemes are similar and where a certain overlapping of characteristics arises as a result of errors in analysis.

Coarse time distortion with regard to the mapping. Since the test signal is represented "fully resolved" (in other words in the original 10 ms sequence of characteristics) but the references are represented with the few states, the mapping must also map larger sections of the test signal to one state. This does not take into consideration the fact that the speaking speed can only change within tight limits. (A common effect in this situation is the fact that, for example, dictation systems can work better with quickly spoken utterances than with those which are spoken normally or slowly).

These disadvantages should be reduced and/or eliminated by the above method.

In this situation the phonemes are described not by a fixed number of states but by a model (=a sequence of characteristics) which is obtained from the training utterances. The idea behind this is to implement a similar resolution on the reference side as on the test side. The individual steps required to achieve this are as follows:

1. training utterances are spoken as specified, 2. the resulting voice signals are (frequency) analyzed in a fixed time pattern (10 ms-20 ms) and the characteristics are stored, 3. the characteristic sequence (iterative) is subdivided timewise in accordance with the phonetic transcription, whereby models are extracted in each case for the phonemes, 4. from the models obtained from all utterances which correspond to one phoneme, an average "time structure" is calculated in respect of the time sequence of the characteristics, the number of characteristics and also the form of the characteristics, 5. a small code book containing representative characteristics is created (in order to cover the speaker-specific characteristics) for each "frame" (in other words each analysis section) of the average time structure.

Figure 6:
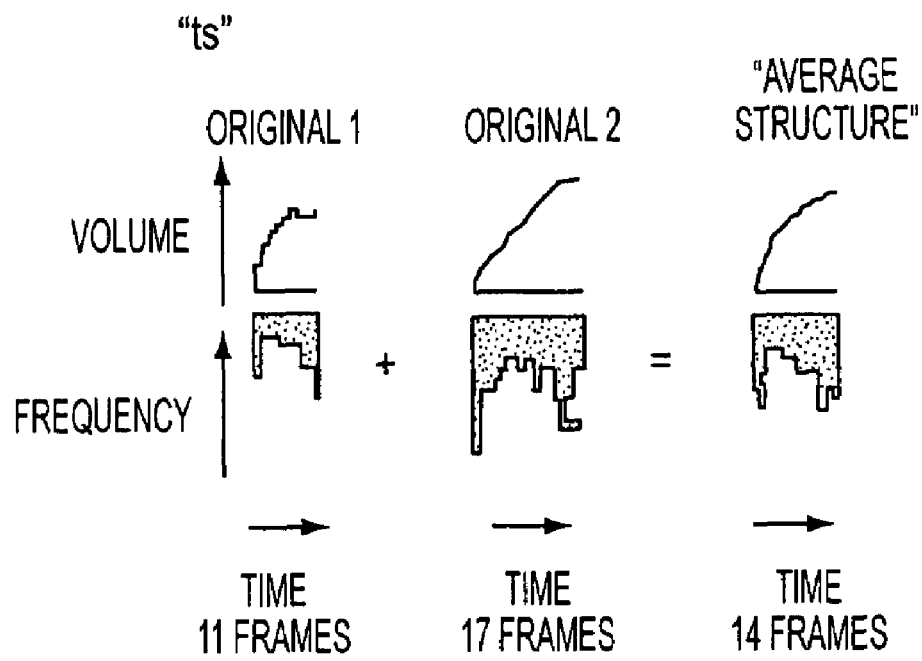
FIG. 6 shows the determination of the average time sequence for the phoneme structure "ts"
Figure 7:
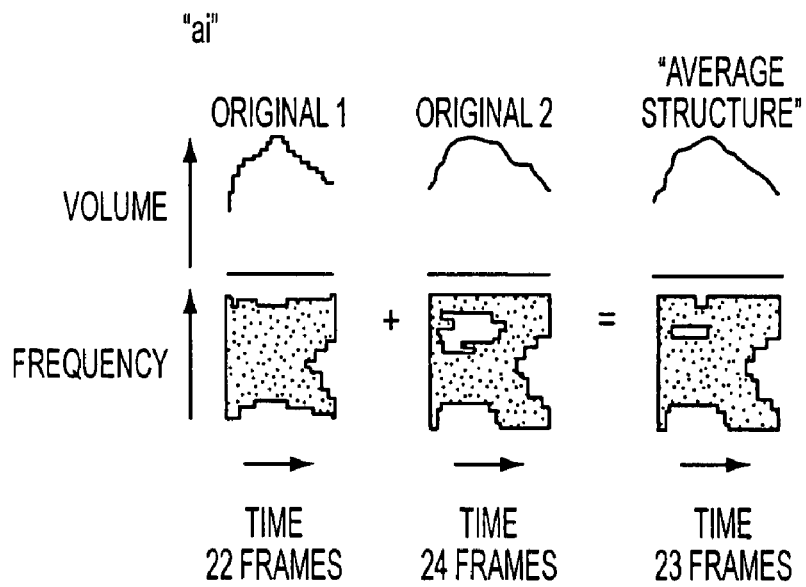
FIG. 7 shows the determination of the average time sequence for the phoneme structure "ai"

FIGS. 6 and 7 are intended to visualize step 4. The models which stand for the phoneme string "ts" are spoken and segmented from different utterances. The averaging of a very short "ts" with 11 analysis windows and a long "ts" with 17 analysis windows results in an average model with 14 analysis windows and spectral characteristics which likewise exhibit an average characteristic and represent the "time structure" (characteristic sequence).

In the second example the glide "ai" has been uttered, whereby the length of the sounds here and thus also of the averaging are practically identical, but the effect of the averaging can be recognized in the characteristic sequence of the characteristics.

The examples show an averaging from n=2 training models. By analogy, this naturally also applies to any value for n.

Figure 8:
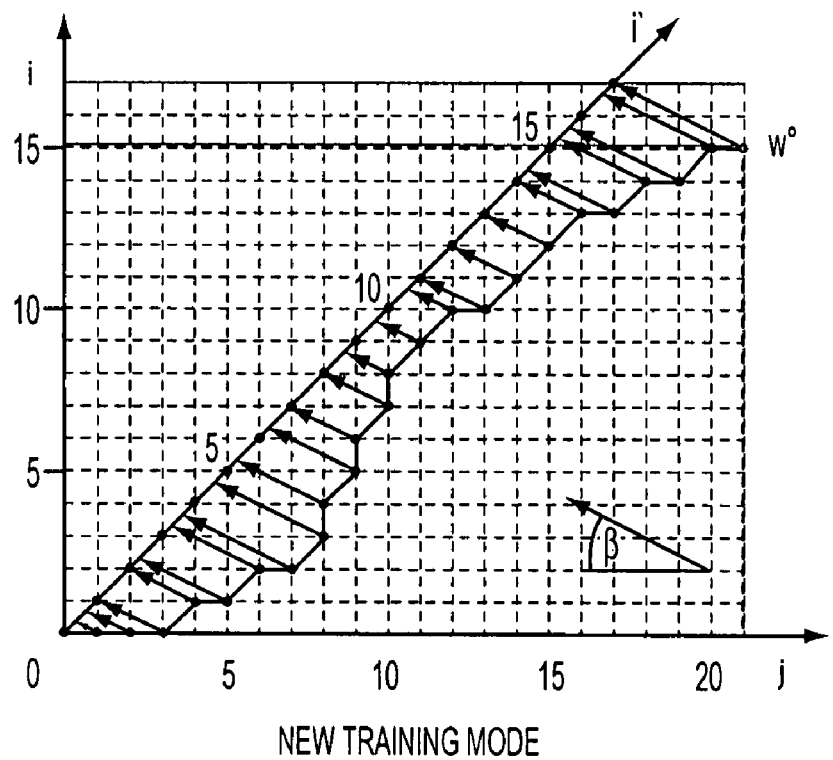
FIG. 8 shows methods used during averaging for the purposes of non-linear mapping and also the projection onto a resulting model.

FIG. 8 shows the methods used during averaging for the non-linear mapping of i and j and also the projection onto a resulting model i.

For step 5, the resulting average structure is now retained. All the models observed during the training are mapped in non-linear fashion onto this structure. A clustering of the characteristics mapped is then carried out for each frame of the average structure.

In the recognition phase, the words to be recognized are composed from the references for the phonemes in accordance with the phonetic transcription. With regard to the "traditional" HMM, it is the states which are arranged side by side, whereas with the proposed method it is the reference segments. The so-called search (the optimum mapping of the test signal onto the formed references) then takes place in the case of HMM by way of a Viterbi algorithm for example, whereas with the proposed method it takes place by way of the (more general) "dynamic time warping" approach. With these methods, the search space is defined by the permitted gradients occurring in the case of the transition from one grid point (in the matrix made up of reference and test models) to the next. In this situation, a gradient of "1" signifies a linear mapping, whereas a gradient of "0" signifies a collapse of the entire test model to one state of the reference model and an "infinite" gradient signifies a collapse of the entire reference model to one analysis frame of the test model.

Figure 9:
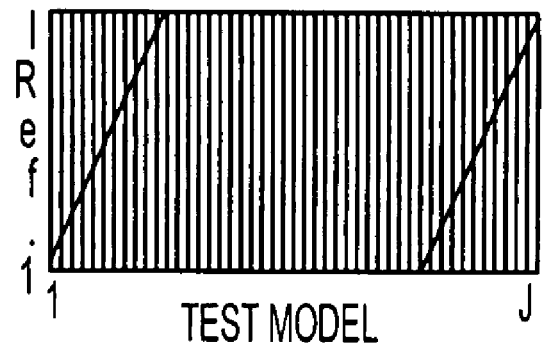
FIG. 9 shows the search during recognition with states in accordance with HMM voice recognition system according to the related art.
Figure 10:
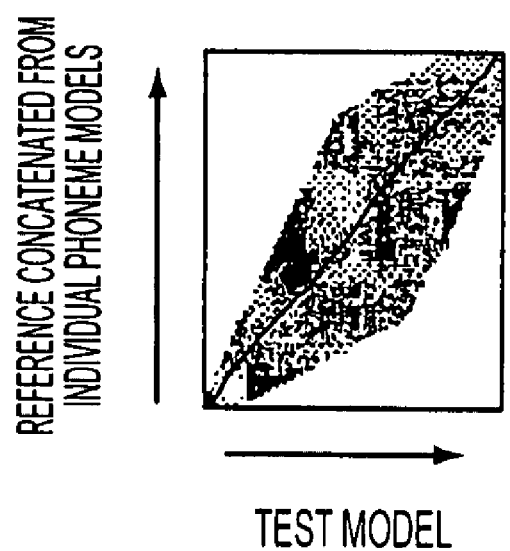
FIG. 10 shows the search during recognition with reference models according to the proposed method.

As can be seen from FIGS. 9 and 10, with regard to the Viterbi algorithm it is also necessary to permit "0" gradients as a result of the differing resolution of reference and test. With the new method, however, the mapping can for example be restricted to a range (0.5 . . . 2), in other words it is assumed that in comparison with an average speaking speed the test signal can be spoken half as fast as a minimum and twice as fast as a maximum. As a result of the restricted mapping range the search is "forced" to also compare all relevant model sections and not to simply skip entire sections.

The invention has been described in detail with particular reference to preferred embodiments thereof and examples, but it will be understood that variations and modifications can be effected within the spirit and scope of the invention.

The invention claimed is:

1. A method for producing reference segments describing speech modules, for a voice recognition system, comprising:

phonetically segmenting a spoken training voice signal into speech modules in accordance with a predefined transcription;
subdividing each speech module into a sequence of time windows;
analyzing the spoken training voice signal in each time window to obtain a characteristic vector for each time window and obtain a training model from a sequence of characteristic vectors corresponding to the sequence of time windows, each speech module having a plurality of training models corresponding to a plurality of different pronunciations for the speech module;
forming an average time structure for each speech module, the average time structure being formed by comparing the plurality of training modules for the speech module, the average time structure containing information regarding an average pronunciation speed and style, the average time structure having a plurality of time windows, the average time structure being formed by mapping the characteristic vectors of the different training models onto the time windows of the average time structure such that each time window of the average time structure contains a plurality of characteristic vectors, the characteristic vectors being mapped using a non-linear mapping; and
saving the plurality of time windows for the average time structure as a reference segment.

2. A method for producing reference segments for a voice recognition system, comprising:
phonetically segmenting a training voice signal into speech modules in accordance with a predefined transcription;
analyzing the training voice signal in predetermined time windows in order to obtain at least one characteristic vector for each time window, as a result of which training models are formed which in each case contain characteristic vectors in the time sequence of the training voice signal;
determining an average time structure, which is an average of change duration and time sequence characteristics, for each speech module;
assigning the characteristic vectors to the average time structure by a temporally non-linear mapping to produce a reference segment; and
storing the reference segment.

3. The method according to claim 2, wherein
the training voice signal is segmented into speech modules to separate phonemes, diphthongs, diphones, triphones or syllables.

4. The method according to claim 2, wherein
the characteristic vectors of the training models represent spectral characteristics, autocorrelation characteristics, LPC characteristics, MFCC characteristics or CC characteristics.

5. The method according to claim 2, wherein
the average time sequence is obtained by performing non-linear mappings of the training models on the speech module to one another and by averaging the mappings.

6. The method according to claim 2, further comprising clustering the characteristic vectors of the time windows.

7. The method according to claim 6, wherein
the number of characteristic vectors per time window are limited to a particular number.

8. The method according to claim 3, wherein
the characteristic vectors of the training models represent spectral characteristics, autocorrelation characteristics, LPC characteristics, MFCC characteristics or CC characteristics.

9. The method according to claim 8, wherein
the average time sequence is obtained by performing non-linear mappings of the training models on the speech module to one another and by averaging the mappings.

10. The method according to claim 9, further comprising clustering the characteristic vectors of the time windows.

11. The method according to claim 10, wherein
the number of characteristic vectors per time window are limited to a particular number.

12. The method according to claim 11, wherein
the number of characteristic vectors corresponds to a variance in the characteristic vectors for the training models, such that if there is a greater variance, more characteristic vectors are used.

13. A method for producing reference segments for a voice recognition system, comprising:
segmenting a training voice signal into speech modules in accordance with a predefined transcription;
analyzing the training voice signal in predetermined time windows in order to obtain at least one characteristic vector for each time window, as a result of which training models are formed which in each case contain characteristic vectors in the time sequence of the training voice signal;
determining an average time structure, which is an average of change duration and time sequence characteristics, for each speech module;
assigning the characteristic vectors to the average time structure by a temporally non-linear mapping to produce a reference segment;
storing the reference segment; and
clustering the characteristic vectors of the time windows, wherein
the number of characteristic vectors corresponds to a variance in the characteristic vectors for the training models, such that if there is a greater variance, more characteristic vectors are used.

14. A method for modeling speech units of a spoken test model in a voice recognition system, comprising:
producing reference segments describing speech modules for a voice recognition system, comprising:
phonetically segmenting a spoken training voice signal into speech modules in accordance with a predefined transcription;
subdividing each speech module into a sequence of time windows;
analyzing the spoken training voice signal in each time window to obtain a characteristic vector for each time window and obtain a training model from a sequence of characteristic vectors corresponding to the sequence of time windows, each speech module having a plurality of training models corresponding to a plurality of different pronunciations for the speech module;
forming an average time structure for each speech module, the average time structure being formed by comparing the plurality of training modules for the speech module, the average time structure containing information regarding an average pronunciation speed and style, the average time structure having a plurality of time windows, the average time structure being formed by mapping the characteristic vectors of the different training models onto the time windows of the average time structure such that each time window of the average time structure contains a plurality of characteristic vectors, the characteristic vectors being mapped using a non-linear mapping; and saving the plurality of time windows for the average time structure as a reference segment;

forming a plurality of reference models, each reference model being formed by combining a plurality of reference segments, each reference model representing a speech unit;

performing a non-linear comparison of the reference models with the test model and determining in each case a distance between the reference model and the test model; and selecting the reference model having the smallest distance from the test model, whereby the speech unit represented by the reference segments is assigned to the test model.

15. The method according to claim 14, wherein
each reference model represents a word to be recognized.

16. The method according to claim 15, wherein
each reference model is formed from a concatenation of the reference segments in accordance with the transcription.

17. The method according to claim 16, wherein
the non-linear comparison is effected by a non-linear time adjustment of the test model to the reference models for the words to be recognized.

18. The method according to claim 17, wherein
the non-linear time adjustment is restricted to a defined working range.

19. The method according to claim 18, wherein
each reference segment has a characteristic vector,
the test model has a characteristic vector,
in performing the non-linear comparison, a distance is determined between the characteristic vector of the test model and each of the characteristic vectors of the reference segment, and the distance is determined to be the minimum of the distances between the characteristic vector of the test model and the characteristic vectors of the reference segments.

20. The method according to claim 19, wherein
distortion is limited in the non-linear mapping.

21. The method according to claim 14, wherein
the non-linear comparison is effected by a non-linear time adjustment of the test model to the reference models for the words to be recognized.

22. The method according to claim 21, wherein
the non-linear time adjustment is restricted to a defined working range.

23. The method according to claim 14, wherein
each reference segment has a characteristic vector,
the test model has a characteristic vector,
in performing the non-linear comparison, a distance is determined between the characteristic vector of the test model and each of the characteristic vectors of the reference segment, and the distance is determined to be the minimum of the distances between the characteristic vector of the test model and the characteristic vectors of the reference segments.

24. The method according to claim 14, wherein
distortion is limited in the non-linear mapping.

* * * * *